2,880,212
REDUCTION OF ALKYLENEDIOXY-ALKYLOXY-METHYL-HYDROPHENANTHRENES

Cyril Anthony Grob and Othmar Schindler, Basel, Switzerland, assignors to Tadeus Reichstein, Basel, Switzerland No Drawing. Application February 18, 1955
Serial No. 489,285
Claims priority, application Switzerland
February 24, 1954

3 Claims. (Cl. 260—340.9)

This invention relates to a process for the manufacture of hydrophenanthrenes and the novel compounds obtained thereby.

More particularly the invention relates to the production of hydrophenanthrenes which can be represented by the following formula in which ring C is saturated and rings A and B are unsaturated or saturated:

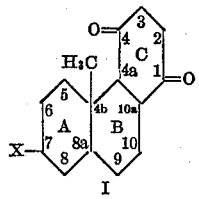

I and in which X represents a free or functionally converted hydroxyl group or oxo group. Of particular interest are 1,4-dioxo-4b-methyl-7-X-1,2,3,4,4a,4b,5,6,7,8, (or 7,9)-10,10a-dodecahydrophenanthrenes and the 1,4-dienol ethers thereof wherein X is a member of the group consisting of a free hydroxy group, oxo group, functionally converted hydroxy group, and functionally converted oxo group.

The aforesaid compounds are important intermediates in the total synthesis of steroids, such as cortisone, hydrocortisone and aldosterone. 1,4-dioxo-4b-methyl-7-ethylene-dioxy - 1,2,3,4,4a,4b,5,6,7,8,10,10a - dodecahydrophenanthrene, for example, can be converted to cortisone by the method described by Sarett et al., Journ. Am. Chem. Soc., vol. 74, 4974 (1952).

According to the present invention, it has been found that the aforesaid hydrophenanthrenes of Formula I can be obtained in a very convenient manner by reducing a hydrophenanthrene compound having the ring system

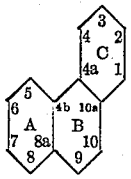

the ring C of which compound is aromatic and which contains as the only substituents etherified hydroxyl groups in the 1 and 4 positions, a methyl group in the 4b position, and a free or functionally converted hydroxy or oxo group in 7-position, with an alkali metal in the presence of a nitrogen base and an alcohol, and hydrolyzing the resulting product.

The starting materials can be made by methods in themselves known. The substituents in the 1,4-position represent hydroxyl groups etherified with monohydric or polyhydric alcohols, such as methanol, ethanol, propanol, ethylene glycol, glycerine or the like, or with an amino alcohol.

The substituent in the 7-position is advantageously a functionally converted hydroxyl or oxo group, such as an esterified or etherified hydroxyl group or an enolized or ketalized oxo group, e.g. an ethylenedioxy group, or the radical of an enamine. Especially valuable starting materials are those which contain a double bond extending from the 8a carbon atom, that is to say a double bond in the 8,8a or 8a,9-position, and especially compounds of the formula

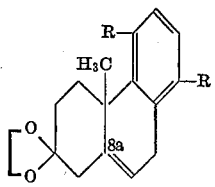

in which R is an etherified hydroxyl group of the type indicated above.

The reduction in accordance with the invention is advantageously carried out by adding to a solution or suspension of the alkali metal in a nitrogen base first the starting material and then the alcohol. However, the components may be brought together in a different order of succession. As nitrogen bases there are used especially ammonia, but there may also be used an aliphatic amine, such as methylamine, ethylamine, ethylene diamine either alone or in admixture with one another.

Volatile bases are used more especially in the liquid form, that is to say, at a low temperature, ammonia at about —40° C., or they may be used under superatmospheric pressure. As alkali metals there are suitable sodium, potassium and lithium, and especially the latter. Among the alcohols there may be mentioned more especially the aliphatic alcohols such as the lower aliphatic alcohols, e.g. methanol, ethanol, propanol, isopropanol, butanol, amyl alcohol or the like. The quantity of alcohol required for the reaction depends on the amount of the alkali metal used, that means that for one atom of alkali metal one mol of alcohol is needed. As a rule, however, the alcohol is used in excess.

It is often of advantage to carry out the reduction in accordance with the invention in the presence of an organic solvent, such as ether, for example, diethyl ether, dimethoxy-ethane, a hydrocarbon, for example, petroleum ether, toluene or the like. When the reaction has finished, which is usually recognized by the disappearance of the color of the alkali metal, the amine may be evaporated and the reduction product isolated, the reaction product being a dienol ether or being hydrolyzed directly to the corresponding 1,4-diketone.

For the hydrolyzing of the dienol-ethers obtained by the present process there are suitable mineral acids or sulfonic acids, advantageously in the presence of a ketone, such as acetone or pyroracemic acid, and also dilute acetic acid at a raised temperature, for example 50–100° C. by hydrolysis under mild conditions, for example, by means of dilute hydrochloric acid, the enol ethers can be selectively split in the ring C, that is to say, without, for example, hydrolyzing a ketal grouping, especially the ethylenedioxy grouping, present in the ring A.

The following examples illustrate the invention:

*Example 1*

180 mg. of clean scraped lithium wire are introduced into 20 cc. of liquid ammonia at about —40° C. in the course of 5 minutes. After stirring for 10 minutes the lithium is dissolved, and then a solution of 800 mg. of 1,4-dimethoxy-4b-methyl-7-ethylene-dioxy - 4b,5,6,7,8,10-hexahydrophenanthrene in 7 cc. of dioxane and 7 cc. of ether is introduced dropwise in the course of 5 minutes. After stirring the mixture for 5 minutes at about —40° C. there are added 3 cc. of absolute ethanol, whereupon the reaction mixture loses its color. By removing the cold bath the ammonia is allowed to evaporate in the course of 3 hours. The yellow-brown residue is dissolved in 70 cc. of ether, the ethereal solution is washed several times with water, then dried over sodium sulfate and evaporated. The residue weighs 848 mg. and is the 1,4-dienol-methyl ether of 1,4-dioxo-4b-methyl-7-ethylenedioxy - 1,2,3,4,4a,4b,5,6,7,8,10,10a - dodecahydrophenanthrene.

In order to hydrolyze the ethylene-dioxy and methoxy groups 160 mg. of the above reduction product are dissolved in 2 cc. of glacial acetic acid, 0.5 cc. of water and 0.25 cc. of concentrated hydrochloric acid are added, and the whole is heated for 15 minutes on a boiling water bath. The reaction mixture is then evaporated in vacuo and the residue is dissolved in a mixture of chloroform and ether (1:4), the solution is washed with potassium bicarbonate solution of 10 percent strength and water, dried over sodium sulfate and evaporated. The neutral residue amounting to 133 mg. is dissolved in benzene and chromatographed over 13 grams of aluminum oxide. By elutriation with mixtures of benzene and ether (85:15) and (70:30), there is obtained 1,4,7-trioxo-4b-methyl-1,2,3,4,4a,4b,5,6,7,9,10,10a - dodecahydrophenanthrene melting at 118–121° C.

*Example 2*

0.64 gram of clean lithium wire is added in portions to a solution of 2 grams of 1,4-dimethoxy-4b-methyl-7-ethylene-dioxy-4b,5,6,7,8,10-hexahydrophenanthrene in 10 cc. of 1,2-dimethoxy-ethane in 40 cc. of liquid ammonia in the course of 10 minutes while stirring. After a further 10 minutes 2.5 grams of absolute alcohol are introduced dropwise in the course of 15 minutes, whereupon the solution loses color. After evaporating the ammonia the residue is distributed between ether and water, and the washed ethereal solution is dried over sodium sulfate and evaporated, and there remain behind 2.4 grams of crude 1,4-dienol-methyl ether of the 1,4-dioxo-4b-methyl-7-ethylene-dioxy - 1,2,3,4,4a,4b,5,6,7,8,10,10a - dodecahydrophenanthrene.

In order to hydrolyze the reduction product it is dissolved in 25 cc. of glacial acetic acid, then mixed with 6 cc. of water and 3 cc. of concentrated hydrochloric acid, and the whole is heated on a boiling water bath for 15 minutes. After evaporating the mixture in vacuo, the residue is dissolved in a mixture of chloroform and ether (1:4), and the solution is washed with a potassium hydrogen carbonate solution of 10 percent strength and water, dried over sodium sulfate and evaporated. A solution of the residue in a mixture of acetone and ether, yields after inoculation 1,4,7-trioxo-4b-methyl-1,2,3,4,-4a,4b,5,6,7,8,10,10a - dodecahydrophenanthrene melting at 118–120° C.

*Example 3*

440 mg. of clean lithium wire are introduced into 20 cc. of liquid ammonia in the course of 10 minutes. After stirring the dark blue colored solution for 10 minutes, 800 mg. of 1,4-dimethoxy-4b-methyl-7-ethylenedioxy-4b,5,6,7,8,10-hexahydrophenanthrene in 5 cc. of dioxane freshly distilled over sodium and 10 cc. of absolute ethylene glycol dimethyl ether are added dropwise in the course of 10 minutes. During this operation the solution becomes considerably paler and is of a violet color when the addition is complete. 4.5 cc. of absolute alcohol are then added dropwise in the course of 10 minutes until the solution loses color, and the ammonia is allowed to evaporate in the course of 3 hours. After adding 30 cc. of water, the whole is extracted twice with 150 cc. of ether each time, the ethereal solutions washed four times with 15 cc. of water each time, dried over sodium sulfate and evaporated. The residue amounts to 816 mg. and yields 415 mg. of the starting material with melting point 83–86° C. after being crystallized twice from pentane with a little ether.

The mother liquor (377 mg.) which cannot be crystallized is divided into two parts A and B:

(A) 145 mg. of the mother liquor are dissolved in 5 cc. of methanol mixed with 0.5 cc. of 2 N-hydrochloric acid and boiled for 15 minutes under reflux. 5 cc. of water are then added and the methanol distilled in vacuo. The turbid aqueous solution is extracted twice with 20 cc. of ether each time and the ethereal solution washed three times with 1 cc. of a potassium bicarbonate solution of 10 percent strength each time and twice with 3 cc. of water each time, dried over sodium sulfate and evaporated; residue 107 mg. The latter is chromatographed in an analogous manner to that described in Example 1 over 10 grams of aluminum oxide, whereby 17 mg. of 1,4-dimethoxy-4b-methyl-7-oxo-4b,5,6,7,8,10-hexahydrophenanthrene and 17.5 mg. of 1,4,7-trioxo-4b-methyl - 1,2,3,4,4a,4b,5,6,7,9,10,10a - dodecahydrophenanthrene are obtained.

(B) 232 mg. of the above mother liquor are dissolved in 1.5 cc. of alcohol and mixed with 0.5 cc. of 2 N-hydrochloric acid. After allowing the mixture to stand for 10 minutes at 20° C. the hydrolysis is interrupted by the addition of 0.8 cc. of 2 N-caustic soda solution. The solution is extracted three times with 20 cc. of ether each time, the ethereal solutions are washed three times with 1 cc. of water each time, dried over sodium sulfate and evaporated. The residue (207 mg.) is dissolved in petroleum ether (50–60° C.)-benzene-(90:10) and adsorbed on 6 grams of aluminum oxide and allowed to stand for 2 hours. Chromatography is then carried out with fractions of 20 cc. From the fractions elutriatable with mixtures of petroleum ether and benzene (20:80) and benzene (19 mg.) there are obtained from ether and pentane 8 mg. of crystals of 1,4-dioxo-7-ethylenedioxy - 1,2,3,4,4a,4b,5,6,7,8,10,10a - dodecahydrophenanthrene melting at 121–124° C.

What is claimed is:

1. A process for the manufacture of hydrophenanthrenes which comprises reducing a hydrophenanthrene having the ring system

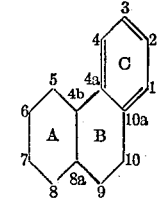

the ring C of which compound contains as the only substituents a lower alkyloxy group in each of the 1- and 4-positions, a methyl group in the 4b-position, an ethylenedioxy group in the 7-position, with an alkali metal in the presence of a member of the group consisting of ammonia and amino-substituted lower alkane and a lower alkanol, and hydrolyzing the resulting product with an acid.

2. A process as claimed in claim 1 in which the reduction is carried out with lithium in the presence of ammonia and ethanol.

3. A process as claimed in claim 1 in which the starting hydrophenanthrene is a compound of the formula

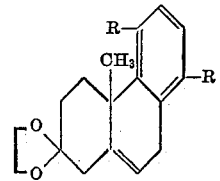

in which R represents a lower alkyloxy group.

References Cited in the file of this patent

UNITED STATES PATENTS

| | | |
|---|---|---|
| 2,702,290 | Sondheimer et al. | Feb. 15, 1955 |
| 2,722,532 | Arth et al. | Nov. 1, 1955 |

OTHER REFERENCES

Poos et al.: Journal American Chem. Soc., 75 (1953), pp. 422–29.